United States Patent
Higashira et al.

(10) Patent No.: US 7,816,454 B2
(45) Date of Patent: Oct. 19, 2010

(54) POLYOL-CROSSLINKABLE FLUORO-RUBBER COMPOSITION

(75) Inventors: Toshihiro Higashira, Fujisawa (JP); Hiroyuki Sano, Fujisawa (JP)

(73) Assignee: NOK Corporation, Tokyo (JP)

( * ) Notice: Subject to any disclaimer, the term of this patent is extended or adjusted under 35 U.S.C. 154(b) by 94 days.

(21) Appl. No.: 11/920,305

(22) PCT Filed: Apr. 5, 2006

(86) PCT No.: PCT/JP2006/307209

§ 371 (c)(1),
(2), (4) Date: Nov. 13, 2007

(87) PCT Pub. No.: WO2006/120818

PCT Pub. Date: Nov. 16, 2006

(65) Prior Publication Data

US 2009/0082526 A1    Mar. 26, 2009

(30) Foreign Application Priority Data

May 11, 2005    (JP) .............................. 2005-138024

(51) Int. Cl.
C08L 27/12    (2006.01)

(52) U.S. Cl. .................. 525/199; 525/191; 525/192; 525/196

(58) Field of Classification Search .................. 525/461, 525/69, 72, 79, 340, 360, 362, 363, 367, 525/368, 369, 191, 192, 196, 199
See application file for complete search history.

(56) References Cited

U.S. PATENT DOCUMENTS

| 5,218,026 | A  | * | 6/1993  | Toda et al.      | 525/255  |
|-----------|----|---|---------|------------------|----------|
| 6,110,546 | A  | * | 8/2000  | Honda et al.     | 428/31   |
| 6,303,699 | B1 | * | 10/2001 | Naraki et al.    | 525/326.3|
| 2004/0018368 | A1 | * | 1/2004 | Kerstetter et al. | 428/522 |
| 2004/0142135 | A1 | * | 7/2004 | Verschuere et al. | 428/36.91 |
| 2004/0247811 | A1 | * | 12/2004 | DiMascio et al.  | 428/36.91 |

FOREIGN PATENT DOCUMENTS

| JP | 55-151051    |   | 11/1980 |
|----|--------------|---|---------|
| JP | 58-023846    |   | 2/1983  |
| JP | 59-041350    |   | 3/1984  |
| JP | 07-082449    | * | 3/1995  |
| JP | 07-224200    | * | 8/1995  |
| JP | 11-034226    |   | 2/1999  |
| JP | 2005-146099  |   | 6/2005  |
| JP | 2005-154529  |   | 6/2005  |
| WO | WO 03/104321 |   | 12/2003 |
| WO | WO 2004-094479 | * | 4/2004 |

OTHER PUBLICATIONS

JP 07-224200 English translation [Online], accessed via the Internet [Retrieved on Apr. 16, 2009], URL:<http://www.ipdl.inpit.go.jp/homepg_e.ipdl>.*
IDEMA Standards, Microcontamination, Document No. M12-99, p. 1-12, 1999 [online], accessed via the Internet [retrieved on Nov. 16, 2009], URL: <http://www.idema.org/_smartsite/modules/local/data_file/show_file.php?cmd=standards#>.*

* cited by examiner

Primary Examiner—James Seidleck
Assistant Examiner—Robert Jones, Jr.
(74) Attorney, Agent, or Firm—Brinks Hofer Gilson & Lione

(57) ABSTRACT

A polyol-crosslinkable fluororubber composition comprises 100 parts by weight of polyol-crosslinkable fluororubber; 0.5 to 10 parts by weight of a perfluoroalkane represented by the general formula $F(CF_2)_{2n}F$ (n: 5~30), a 1H-perfluoroalkane represented by the general formula $F(CF_2)_m H$ (m: 10~30), or a mixture thereof; 0.5 to 2 parts by weight of basic magnesium aluminum hydroxycarbonate hydrate; and 1 to 5 parts by weight of an acid acceptor compound excluding Ca compounds. The fluororubber composition can simultaneously attain improvement in preservation stability of compounds, prevention of compounds from adhesion at time of kneading, short-time vulcanization, improvement of mold releasability at the time of vulcanization molding, prevention of contamination with metal ions and reduction in adhesiveness of crosslinking products due to increase of crosslinking density without substantially impairing the normal state physical properties or compression set characteristics and further advantage-ous properties inherent in the fluororubber, and contains no calcium compounds causing contamination of HDD.

10 Claims, No Drawings

POLYOL-CROSSLINKABLE FLUORO-RUBBER COMPOSITION

TECHNICAL FIELD

The present invention relates to a polyol-crosslinkable fluororubber composition. More particularly, the invention relates to a polyol-crosslinkable fluororubber composition for use as suitable molding materials, for hard disc drive (HDD) rubber parts, etc.

BACKGROUND ART

Crosslinking products of fluororubber have a variety of advantageous properties, but still have such disadvantages as a poor moldability at the time of vulcanization molding using a mold, and a high post-molding adhesiveness between the rubbers themselves. Thus, it is a usual practice to apply an external mold-releasing agent of such silicone series, fluorocarbon series, etc. to the mold, surface or add an internal mold-releasing agent to unvulcanized rubber compounds. A vulcanization molding process without an external mold-releasing agent has been now desired particularly from the viewpoint of productivity.

Fluororubber has such a problem that, when the temperature is elevated at the time of the kneading of fluororubber in a kneader, a Banbury mixer, etc., the compounds present inside the kneader tend to undergo adhesion. In that case, application of an external mold-releasing agent is not so effective that the method of adding an internal mold-releasing agent to unvulcanized rubber compounds is usually recommended. In the case of using the internal mold-releasing agent, it is necessary for the internal mold-releasing agent to have not only improvements in the mold releasability and adhesivelessness at the time of kneading naturally, but also no adverse effects on normal state physical properties, compression set characteristics, and further on the heat resistance, chemical resistance, oil resistance, etc. inherent in the fluororubber.

It has been proposed to use low molecular weight polymers of tetra-fluoroethylene as a fairly satisfactory internal mold-releasing agent under these conditions. When the polymers are added in such a large proportion to thoroughly satisfy the mold releasability and adhesivelessness at the time of kneading in that case, there are such problems as increased hardness and restricted degree of freedom as to the compounding, etc., so that no satisfactory level has been attained yet.

Patent Literature 1: JP-B-56-40168
Patent Literature 2: JP-A-58-23846
Patent Literature 3: JP-A-59-41350

Recently, short-time vulcanization has been keenly desired from the viewpoint of productivity, and it has been a usual practice to add a crosslinking promoter, an acid acceptor compound, etc. to accelerate the vulcanization rate. However, in the case of compression molding, not only such problems tend to appear as premature starting of vulcanization before the mold is fully filled with compounds, and occurrence of foaming due to insufficient vulcanization, but also such another problem is liable to occur as spontaneous vulcanization progress due to long-term preservation of compounds at room temperature. According to a method of elevating a molding temperature to accelerate the vulcanization rate, the viscosity of rubber is decreased with elevating temperature, and a gas volume is increased at the time of molding, resulting in a higher tendency for occurrence of foaming after the molding, particularly much foaming occurs in the case JIS A hardness is not more than 60.

When the JIS A hardness of crosslinking products of fluororubber exceeds 60, the sealability of HDD top cover gasket serving to seal at low specific pressure will be unsatisfactory. To make the JIS A hardness 60 or less, it is a usual practice to add liquid additives, but in the case of fluororubber addition of such liquid additives may impair the heat resistance, oil resistance, compression set characteristics, outgassing property, etc. inherent in the fluororubber. By lowering the crosslinking density, the hardness can be lowered without causing such problems, but to lower the crosslinking density, it is necessary to reduce the amount of the crosslinking agent or the acid accepter compound, resulting in a failure in acceleration of the vulcanization rate.

The conventional fluororubber of polyol crosslinking series needs addition of a large amount of such acid acceptor compound to attain the crosslinking, as magnesium oxide, calcium hydroxide, etc. Addition of a large amount of the acid acceptor compound leads to inevitable elevation of the hardness, which is not appropriate for HDD top cover gaskets serving to seal at low specific pressure. Metal ions of the acid acceptor compound such as magnesium ions, calcium ions, etc. have a possibility of contaminating the HDD, and thus it is desirable to use as small an amount of the acid acceptor compound as possible to reduce contamination with the metal ions. Particularly calcium compounds, when used, will cause serious HDD contamination.

DISCLOSURE OF THE INVENTION

Problem to be Solved by the Invention

An object of the present invention is to provide a polyol-crosslinkable fluororubber composition containing no such a calcium compound as an HDD contaminant, which can simultaneously attain improvement in the preservation stability of compounds, the prevention of compounds from adhesion at the time of kneading, the short-time vulcanization, improvement of mold releasability at the time of vulcanization molding, prevention of contamination with metal ions, and an increase in the crosslinking density, thereby reducing the adhesiveness of crosslinking products, without substantially impairing the normal state physical properties, compression set characteristics, and furthermore the advantageous properties inherent in the fluororubber.

Means for Solving the Problem

Such an object of the present invention can be attained by a polyol-crosslinkable fluororubber composition, which comprises 100 parts by weight of a polyol-crosslinkable fluororubber; 0.5 to 10 parts by weight of a perfluoroalkane represented by the general formula $F(CF_2)_{2n}F$ (where n is an integer of 5 to 30), a 1H-perfluoroalkane represented by the general formula $F(CF_2)_mH$ (where m is an integer of 10 to 30), or a mixture thereof; 0.5 to 2 parts by weight of basic magnesium aluminum hydroxycarbonate hydrate; and 1 to 5 parts by weight of an acid acceptor compound excluding a Ca compound, and which preferably further contains a quaternary phosphonium salt crosslinking promoter together with a polyol crosslinking agent.

EFFECT OF THE INVENTION

The present polyol-crosslinkable fluororubber composition can simultaneously attain improvement in the preservation stability of compounds, prevention of compounds from adhesion at the time of kneading, short-time vulcanization, improvement of mold releasability at the time of vulcanization molding, prevention of contamination with metal ions, and an increase in the crosslinking density, thereby reducing the adhesiveness of crossling products, without causing HDD contamination due to the absence of a Ca compound as an acid acceptor compound and without substantially impairing the normal state physical properties, compression set characteristics, and furthermore the advantageous properties inherent in the fluororubber. More specifically, for example, the present composition has a Mooney scorch time $t_5$ (125° C.) of 60 minutes or more and is compression moldable at a temperature of 210° C. or lower for not more than 2 minutes, and crosslinking products of fluororubber having a JIS A hardness (according to JIS K6253 corresponds to ISO 7619; a 2 mm thick rubber sheet was subjected to determination by a Type A durometer) of not more than 60 can be obtained.

BEST MODES FOR CARRYING OUT THE INVENTION

Polyol-crosslinkable fluororubber includes, for example, homopolymers, and intercopolymers of vinylidene fluoride, hexafluoropropene, pentafluoropropene, trifluoroethylene, trifluorochloroethylene, tetrafluoroethyllene, vinyl fluoride, perfluoroacrylic acid ester, perfluoroalkyl acrylate, perfluoro (methyl vinyl ether), perfluoro(ethyl vinyl ether), perfluoro (propyl vinyl ether), etc., or copolymers thereof with propylene, and preferably vinylidene fluoride—hexafluoropropene copolymer, vinylidene fluoride—hexafluoropropene—tetrafluoroethylene terpolymer, tetrafluoroethylene—propylene copolymer, etc. Usually, commercially available fluororubber can be used as such.

Polyol-based crosslinking agent includes, for example, 2,2-bis(4-hydroxyphenyl) propane [bisphenol A], 2,2-bis(4-hydroxyphenyl) perfluoropropane [bisphenol AF], bis(4-hydroxyphenyl) sulfone [bisphenol S], 2,2-bis-(4-hydroxyphenyl)methane [bisphenol F], bisphenol A-bis(diphenylphosphate), 4,4'-dihydroxydiphenyl, 2,2-bis(4-hydroxyphenyl)butane, etc., and preferably bisphenol A, bisphenol AF, etc. are used. These may be also in the form of alkali metal salts or alkaline earth metal salts. The polyol-based crosslinking agent can be used usually in a proportion of about 0.5 to about 10 parts by weight, preferably about 0.5 to about 6 parts by weight on the basis of 100 parts by weight of fluororubber.

The crosslinking promoter for use in the present invention includes, for example, quaternary phosphonium salts, equimolar molecule compounds thereof with an active hydrogen-containing aromatic compound, etc., and preferably quaternary phosphonium salts are used. The quaternary phosphonium salts can be represented by the general formula:

$$(R_1R_2R_3R_4P)^+X^-,$$

where $R_1$~$R_4$: alkyl groups having 1~25 carbon atoms, alkoxyl groups, aryl groups, alkylaryl groups, aralkyl groups, or polyoxyalkylene groups, or two or three of which can form a heterocyclic structure together with N, or P, and $X^-$: an anion of $Cl^-$, $Br^-$, $I^-$, $HSO_4^-$, $H_2PO_4^-$, $RCOO^-$, $ROSO_2^-$, $CO_3^{--}$, etc.

Specifically, tetraphenylphosphonium chloride, benzyltriphenylphosphonium bromide, benzyltriphenylphosphonium chloride, trioctylbenzylphosphonium chloride, trioctylmethylphosphonium chloride, trioctylethylphosphonium acetate, tetraoctylphosphonium chloride, etc. can be used. The quaternary phosphonium salt is used in a proportion of about 0.1 to about 10 parts by weight, preferably about 0.5 to about 5 parts by weight, on the basis of 100 parts by weight of fluororubber.

100 parts by weight of the fluororubber to be compounded with these polyol-based crosslinking agent and crosslinking promoter are admixed with 0.5 to 10 parts by weight, preferably 1 to 5 parts by weight, of a perfluoroalkane, and 0.5 to 2 parts by weight, preferably 0.5 to 1.5 parts by weight, of a basic magnesium aluminum hydroxycarbonate hydrate.

Perfluoroalkane represented by the general formula $F(CF_2)_{2n}F$ can be prepared by coupling perfluoroalkyl iodide represented by the general formula $F(CF_2)_nI$, and specifically includes perfluorodecane, perfluorododecane, perfluorohexadecane, perfluorooctadecane, perfluoroeicosane, perfluorotetracosane, perfluorooctacosane, perfluorotriacontane, perfluorotetracontane, perfluoropentacontane, perfluorohexacontane, etc., which can be used alone or in mixture. In the foregoing general formula, n is defined as 5 to 30. When n is less than 5, the gas volume just after the compression molding will be increased, so that the molding products get foamed, whereas, when n is more than 30, the mold releasability will be deteriorated.

1H-perfluoroalkane represented by the general formula $F(CF_2)_mH$ can be prepared by reaction of perfluoroalkyl halide with zinc, and specifically includes, for example, 1H-perfluorodecane, 1H-perfluorododecane, 1H-perfluorohexadecane, 1H-perfluorooctadecane, 1H-perfluoroeicosane, 1H-perfluorotetracosane, 1H-perfluorooctacosane, 1H-perfluorotriacontane, etc., which can be used alone or in mixture. In the foregoing general formula, m is defined as 10 to 30. When m is less than 10, the gas volume just after the compression molding will be increased, so that foaming takes place on the molding surfaces, whereas, when m is more than 30, the mold releasability will be deteriorated.

When the perfluoroalkane is used in a proportion of less than 0.5 parts by weight, no effect will be obtained on improvements in the prevention of compounds from adhesion at the time of kneading or the mold releasability at the time of vulcanization molding, as aimed at in the present invention, whereas, when it is used in a proportion of more than 10 parts by weight, foaming will take place just after the molding, and vulcanization characteristics of the resulting vulcanization molding products will be deteriorated.

Basic magnesium aluminum hydroxycarbonate hydrate as an another essential component of the present invention can be represented by the general formula:

$$Mg_xAl_2(OH)_yCO_3 \cdot mH_2O,$$

where x: an integer of 4 to 6, or an average value of a mixture thereof, and y: an integer of 12 to 18, or an average value of a mixture thereof, and, for example, the following compounds can be usually used:

$Mg_6Al_2(OH)_{16}CO_3 \cdot 4H_2O$ $Mg_{4.3}Al_2(OH)_{12.6}CO_3 \cdot 3.5H_2O$ $Mg_{4.5}Al_2(OH)_{13}CO_3 \cdot 3.5H_2O$ $Mg_4Al_2(OH)_{13.5}CO_3 \cdot 3.5H_2O$ These compounds can be prepared by adding an aqueous NaOH solution and an aqueous $Na_2CO_3$ solution to an aqueous solution of a mixture of $MgCl_2$ and $AlCl_3$ with stirring, adjusting pH to about 10, and recovering and drying white precipitates, and the resulting white powders are herein used. Besides water-soluble salts, hydroxides, oxides, and carbonates may be used as raw materials for the respective metals.

Commercially available products similar to the basic magnesium aluminum hydroxy-carbonate hydrates may be also herein used.

When the basic magnesium aluminum hydroxycarbonate hydrate is used in a proportion of less than 0.5 parts by weight, the compression molding is still not in a suitable condition to conduct at 210° C. within two minutes, though the Mooney scorch time $t_5$ (125° C.) can be made 60 minutes or longer, that is, it is impossible to prolong the scorch time and also shorten the vulcanization time at the same time. Compression molding within 2 minutes in a proportion of less than 0.5 parts by weight may be carried out by increasing the amount of an acid acceptor compound to be added such as a divalent metal oxide or hydroxide, but such problems as occurrence of crosslinked fluororubber tacking and contamination with metal ions are inevitable. In a proportion of more than 2 parts by weight, on the other hand, the Mooney scorch time $t_5$ (125° C.) will fail to be 60 minutes or longer, and the stable preservation time of compounds will be shorter and when molding is carried out at temperatures of 200° C. or higher, foaming takes place after the molding, and the hardness will be further increased, resulting in worse sealability.

It has been already proposed to compound the fluororubber with a perfluoroalkane or a hydrotalcite-similar compound individually, but in the case of compounding with a perfluoroalkane the vulcanization products having a JIS A hardness of not more than 60 have a poor post-molding mold releasability and also the vulcanization rate is low. Thus, this is not preferable from the viewpoint of productivity. In the case of compounding with a hydrotalcite-similar compound, the post-molding moldability is poor, the vulcanization rate is high, and the stability of compounds is shortened. Thus, this is also not preferable from the viewpoint of production stability. Anyway, it is not only impossible to make the Mooney scorch time $t_5$ (125° C.) of 60 minutes or more, to conduct compression molding at 210° C. or lower within 2 minutes, and to obtain crosslinking products of fluororubber having a JIS A hardness of 60 or less in any of these cases, but also in the case of using calcium hydroxide or oxide as an acid acceptor compound, contamination of HDD, etc. with metal ions is inevitable.

Patent Literature 4: JP-A-7-224200
Patent Literature 5: JP-A-7-82449

Acid acceptor compounds excluding Ca compounds, such as Mg compounds, e.g. magnesium oxide, magnesium hydroxide, magnesium carbonate, magnesium carbonate hydroxide, magnesium potassium hydrogencarbonate, etc. or Zn compounds, e.g. zinc oxide, zinc peroxide, etc. can be used in a proportion of 1 to 5 parts by weight, preferably 2 to 5 parts by weight, on the basis of 100 parts by weight of fluororubber. In a proportion of less than 1 part by weight, the function as an acid acceptor compound will not be enough to attain satisfactory vulcanization, whereas in a proportion of more than 5 parts by weight contamination with metal ions will be a problem, and also preservation stability of compounds will be shortened. Thus, this is not preferable.

The fluororubber composition comprising the forementioned respective components as essential ones may be appropriately admixed, if necessary, with additives usually used in the rubber industry, such as a reinforcing agent, e.g. carbon black, carbon fibers, silica, etc., a processing aid, e.g. wax, etc., an antioxidant, thermoplastic resin, etc.

The rubber composition can be prepared by kneading in a tightly closed kneader such as Intermix, a kneader, a Banbury mixer, etc., or open rolls, etc., and the kneading products have a Mooney scorch time $t_5$ (125° C.) of 60 minutes or more. Vulcanization molding is carried out by an injection molding machine, a compression molding machine, a vulcanization press, etc., and usually by press vulcanization at about 140° to about 230° C. for about 1 to about 30 minutes, and, if necessary, secondary vulcanization is carried out by oven vulcanization at about 150° to about 300° C., preferably about 200° to about 250° C. for not more than 24 hours. When compression molding is carried out at 210° C. or lower, more specifically 190° to 210° C., the molding can be finished within 2 minutes, and the resulting crosslinking products of fluororubber have a JIS A hardness of 60 or less, preferably 40 to 56.

EXAMPLES

The present invention will be described below, referring to Examples.

Example 1

|  | Parts by weight |
| --- | --- |
| Fluororubber (Viton A-200, a product of DuPont•Dow•Elastomer Company) | 100 |
| FEF carbon black (Seast GSO, a product of Toyo Carbon Co.) | 2 |
| Basic magnesium aluminum hydroxycarbonate hydrate (DHT-4A, a product of Kyowa Chemical Co.) | 1.5 |
| Magnesium oxide (Kyowamag 150, a product of the same company as above) | 3 |
| Bisphenol AF | 2 |
| Triphenylbenzylphosphonium chloride | 0.53 |
| Perfluoroalkane A [mixture of 80 wt. % of $F(CF_2)_{24}F$ and 20 wt. % of $F(CF_2)_{12}H$] | 3 |

The foregoing components were kneaded by a kneader and open rolls, followed by compression molding at 180° C. for 10 minutes, and heat treatment in an oven at 230° C. for 5 hours.

The resulting molding product was subjected to determination of the following items:

Mooney scorch time: According to JIS K6300-1(corresponds to ISO 289), time $t_5$ required for elevation by 5M from the minimum viscosity at 125° C., after preheating for one minute was determined by using a square groove die and an L-type rotor of Mooney viscometer, made by Toyo Seiki Co. Compound just after the kneading and compound left to stand for 15 days in a tightly closed container controlled at a temperature of 25° C. and 70% humidity were individually subjected to determination Vulcanization rate: According to JIS K6300-2(corresponds to ISO 6502), vulcanization rate was determined at 180° C. and 210° by a rotorless rheometer, made by Toyo Seiki Co.

Difference $M_E$ ($M_H$-$M_L$) was determined from minimum torque $M_L$ and maximum torque $M_H$, and vulcanization time tc (50) for 50% $M_E$ was taken as an index for vulcanization rate Hardness: According to JIS K6253 (corresponds to ISO 6719), a 2 mm-thick rubber sheet was subjected to determination by a Type A durometer Tensile strength and elongation: According to JIS K6251 (corresponds to ISO 37), a 2 mm-thick rubber sheet was subjected to determination Compression set: According to JIS K6262 (corresponds to ISO 815), determination was made under conditions of 175° C., 25% compression and duration of 72 hours Evaluation of moldability: Disc-shaped sheets, 0.5 mm in thickness and 100 mm in diameter, were made by compression molding under conditions of 180° C. for 10 minutes, 210° C. for one minute, and 210° C. for two minutes, respectively, and presence of foams on the respective sheets was visually inspected Evaluation of adhesiveness and mold releasability of crosslinked fluororubber: Unvulcanized rubber compounds were sandwiched between chromium-plated steel plates (60 mm×25 mm) and subjected to crosslinking molding at 180° C. for 10 minutes, followed by a tensile shearing test according to JIS K6850 (corresponds to ISO 4587) to evaluate a mold releasability in view of the adhesiveness between the steel plates and the rubber Evaluation of sealability: Gasket integrally molded with a cover was fitted to a real leak tester and subjected to application of positive pressure of 5 kPa thereto in that state from the inside of the tester continuously for 30 seconds to check whether or not there was any leakage 15 seconds thereafter, thereby absence of any leakage was assessed as ○, whereas presence of a leakage as X In the case the gasket materials have poor compression set characteristics or the gasket shape has a defect such as foams, etc, leakage takes place at positions of higher rubber hardness and far from the fastening bolts Evaluation of outgassing property: Gaskets were subjected to hot extraction at 100° C. for 16 hours to determine an outgas volume, thereby outgas volume of less than 10 μg/g was assessed as ○, whereas that of 10 μg/g or more as X Evaluation of contamination with metal ions: Two gaskets (1.5 mm in wire diameter and 55 mm in diameter) were dipped in 100 ml of ultrapure water at room temperature for 10 minutes to determine amounts of metal ions (magnesium ions and calcium ions) dissolved into the ultrapure water from the acid acceptor compound added to the rubber by an ion chromatography, thereby evaluating degrees of contamination with metal ions Example 2

In Example 1, the amount of perfluoroalkane A was changed to one part by weight.

Example 3

In Example 1, the amount of perfluoroalkane A was changed to 5 parts by weight.

Example 4

In Example 1, the amount of basic magnesium aluminum hydroxycarbonate hydrate was changed to 0.5 parts by weight.

The results obtained in the foregoing individual Examples are shown in the following Table 1.

TABLE 1

| Items of determination and evaluation | | Example No. | | | |
|---|---|---|---|---|---|
| | | 1 | 2 | 3 | 4 |
| Mooney scorch time $t_5$ | | | | | |
| Just after kneading | (min.) | 155 | 153 | 160 | 200 |
| 15 days after left standing | (min.) | 144 | 143 | 152 | 188 |
| Vulcanization rate tc(50) | | | | | |
| 180° C. | | 3.2 | 2.9 | 3.4 | 5.0 |
| 210° C. | | 1.4 | 1.3 | 1.5 | 2.0 |
| Vulcanization product physical properties | | | | | |
| Hardness | (JIS A) | 54 | 55 | 53 | 53 |
| Tensile strength | (MPa) | 8.7 | 8.9 | 8.5 | 7.5 |
| Elongation | (%) | 370 | 360 | 400 | 450 |
| Compression set | | | | | |
| 175° C. for 72 hours | (%) | 12 | 10 | 13 | 17 |
| Evaluation of moldability | | | | | |
| 180° C. for 10 minutes | | ○ | ○ | ○ | ○ |
| 210° C. for one minute | | ○ | ○ | ○ | X |
| 210° C. for two minutes | | ○ | ○ | ○ | ○ |
| Evaluation of adhesiveness and mold releasability | | | | | |
| Tackiness | (kg/cm²) | 0.5 | 1.0 | 0.3 | 1.5 |
| Evaluation of sealability | | | | | |
| Leakage occurrence | | ○ | ○ | ○ | ○ |
| Evaluation of outgassing property | | | | | |
| 10 μg/g basis | | ○ | ○ | ○ | ○ |
| Evaluation of contamination with metal ions | | | | | |
| Mg ions (μg/one product) | | 0.04 | 0.04 | 0.04 | 0.02 |
| Ca ions (μg/one product) | | 0 | 0 | 0 | 0 |

Comparative Example 1

In Example 1, no perfluoroalkane A was used.

Comparative Example 2

In Example 1, the amount of perfluoroalkane A was changed to 15 parts by weight.

Comparative Example 3

In Example 1, the same amount of perfluoroalkane B [mixture of 80 wt. % $F(CF_2)_6F$ and 20 wt. % $F(CF_2)_6H$] was used in place of parfluoroalkane A.

Comparative Example 4

In Example 1, the same amount of perfluoroalkane C [mixture of 80 wt. % $F(CF_2)_{100}F$ and 20 wt. % $F(CF_2)_{50}H$] was used in place of parfluoroalkane A.

Comparative Example 5

In Example 1, the same amount of tetrafluoroethylene low molecular weight polymer (Rubron L5F, a product of Daikin Co.) was used in place of perfluoroalkane A.

Comparative Example 6

In Example 1, the amount of basic magnesium aluminum hydroxycarbonate hydrate was changed to 6 parts by weight.

Comparative Example 7

In Example 1, no basic magnesium aluminum hydroxycarbonate hydrate was used.

Comparative Example 8

In Example 1, in place of the basic magnesium aluminum hydroxycarbonate hydrate, 2 parts by weight of triphenylbenzylphosphonium chloride was used.

Comparative Example 9

In Example 1, neither basic magnesium aluminum hydroxycarbonate hydrate nor perfluoroalkane A was used.

Comparative Example 10

In Example 1, the amount of basic magnesium aluminum hydroxycarbonate hydrate was changed to 3 parts by weight, and no perfluoroalkane A was used.

Comparative Example 11

In Example 1, in place of the basic magnesium aluminum hydroxycarbonate hydrate, 6 parts by weight of calcium hydroxide (Caldic #2000, a product of Ohmi Chemical Co.) was used.

The results of the foregoing individual Comparative Examples are shown in the following Tables 2 and 3.

TABLE 2

| Items of determination and evaluation | | Comparative Example No. | | | | |
|---|---|---|---|---|---|---|
| | | 1 | 2 | 3 | 4 | 5 |
| Mooney scorch time $t_5$ | | | | | | |
| Just after kneading | (min.) | 150 | 170 | 153 | 160 | 150 |
| 15 days after left standing | (min.) | 142 | 161 | 142 | 155 | 142 |
| Vulcanization rate tc(50) | | | | | | |
| 180° C. | | 2.8 | 3.5 | 3.0 | 3.2 | 3.1 |
| 210° C. | | 1.2 | 1.6 | 1.3 | 1.4 | 1.5 |
| Vulcanization product physical properties | | | | | | |
| Hardness | (JIS A) | 55 | 51 | 54 | 56 | 56 |
| Tensile strength | (MPa) | 9.2 | 4.5 | 8.6 | 8.0 | 9.0 |
| Elongation | (%) | 350 | 300 | 360 | 330 | 300 |
| Compression set | | | | | | |
| 175° C. for 72 hours | (%) | 10 | 18 | 12 | 15 | 15 |
| Evaluation of moldability | | | | | | |
| 180° C. for 10 minutes | | ◯ | X | ◯ | ◯ | ◯ |
| 210° C. for one minute | | ◯ | X | X | ◯ | ◯ |
| 210° C. for two minutes | | ◯ | X | X | ◯ | ◯ |
| Evaluation of adhesiveness and mold releasability | | | | | | |
| Tackiness | (kg/cm$^2$) | 10 | 0.3 | 0.4 | 8 | 7 |
| Evaluation of sealability | | | | | | |
| Leakage occurrence | | ◯ | ◯ | ◯ | ◯ | ◯ |
| Evaluation of outgassing property | | | | | | |
| 10 µg/g basis | | ◯ | X | X | ◯ | ◯ |
| Evaluation of contamination with metal ions | | | | | | |
| Mg ions (µg/one product) | | 0.04 | 0.04 | 0.04 | 0.04 | 0.04 |
| Ca ions (µg/one product) | | 0 | 0 | 0 | 0 | 0 |

TABLE 3

| Items of determination and evaluation | | Comparative Example No. | | | | | |
|---|---|---|---|---|---|---|---|
| | | 6 | 7 | 8 | 9 | 10 | 11 |
| Mooney scorch time $t_5$ | | | | | | | |
| Just after kneading | (min.) | 10 | >200 | 7 | 53 | 12 | 12 |
| 15 days after left standing | (min.) | 3 | >200 | 2 | 20 | 6 | 7 |
| Vulcanization rate tc(50) | | | | | | | |
| 180° C. | | 1.0 | >10 | 5.5 | 4.5 | 1.2 | 3.5 |
| 210° C. | | 0.7 | 5.0 | 2.5 | 1.2 | 0.9 | 1.0 |
| Vulcanization product physical properties | | | | | | | |
| Hardness | (JIS A) | 58 | 53 | 52 | 62 | 57 | 60 |
| Tensile strength | (MPa) | 10.0 | 7.0 | 7.0 | 8.7 | 9.5 | 12.0 |
| Elongation | (%) | 250 | 550 | 500 | 280 | 290 | 300 |
| Compression set | | | | | | | |
| 175° C. for 72 hours | (%) | 10 | 18 | 25 | 8 | 13 | 12 |
| Evaluation of moldability | | | | | | | |
| 180° C. for 10 minutes | | ○ | X | ○ | ○ | ○ | ○ |
| 210° C. for one minute | | X | X | X | ○ | X | X |
| 210° C. for two minutes | | X | X | ○ | ○ | ○ | ○ |
| Evaluation of adhesiveness and mold releasability | | | | | | | |
| Tackiness | (kg/cm²) | 0.4 | 3.0 | 0.4 | 2.0 | 3.0 | 4.0 |
| Evaluation of sealability | | | | | | | |
| Leakage occurrence | | X | X | ○ | X | X | ○ |
| Evaluation of outgassing property | | | | | | | |
| 10 μg/g basis | | ○ | ○ | X | ○ | ○ | ○ |
| Evaluation of contamination with metal ions | | | | | | | |
| Mg ions (μg/one product) | | 0.15 | 0.04 | 0.04 | 0.15 | 0.10 | 0.12 |
| Ca ions (μg/one product) | | 0 | 0 | 0 | 2.2 | 0 | 25 |

INDUSTRIAL UTILITY

The present polyol-crosslinkable fluororubber can be used as vulcanization molding materials for rubber parts for hard disc drive, for example, hard disc drive top cover, etc., and also can be effectively used as vulcanization molding materials for a variety of rubber parts for preventing a liquid or a gas from leakage, such as Orings, packings, Vpackings, oil seals, gaskets, square rings, D rings, diaphragms, various valves, etc, or a variety of rubber parts such as vibration-damping rubber, belts, rubber-coated cloth, wipers, etc.

The invention claimed is:

1. A polyol-crosslinkable fluororubber composition, which comprises 100 parts by weight of polyol-crosslinkable fluororubber; 0.5 to 10 parts by weight of perfluoroalkane represented by the general formula $F(CF_2)_{2n}F$ (where n is an integer of 5 to 30), 1H-perfluoroalkane represented by the general formula $F(CF_2)_mH$ (where m is an integer of 10 to 30), or a mixture thereof; 0.5 to 1.5 parts by weight of basic magnesium aluminum hydroxycarbonate hydrate, and 2 to 5 parts by weight of an acid acceptor compound excluding Ca compounds.

2. A polyol-crosslinkable fluororubber composition according to claim 1, wherein the acid acceptor compound excluding Ca compounds is a Mg compound or a Zn compound.

3. A polyol-crosslinkable fluororubber composition according to claim 2, wherein the Mg compound as an acid acceptor compound is magnesium oxide, magnesium hydroxide, magnesium carbonate, magnesium carbonate hydroxide, or magnesium potassium hydrogencarbonate.

4. A polyol-crosslinkable fluororubber composition according to claim 2, wherein the Zn compound as an acid acceptor compound is zinc oxide or zinc peroxide.

5. A polyol-crosslinkable fluororubber composition according to claim 1, wherein a quaternary phosphonium salt crosslinking promoter is further contained together with a polyol crosslinking agent.

6. A polyol-crosslinkable fluororubber composition according to claim 1, which has a Mooney scorch time $t_s$ (125° C.) of 60 minutes or more and is compression moldable at a temperature of 210° C. or lower within 2 minutes.

7. A polyol-crosslinkable fluororubber composition according to claim 1, which gives a fluororubber crosslinking product having a JIS A hardness of 60 or less.

8. A polyol-crosslinkable fluororubber composition according to claim 1, which gives a fluororubber crosslinking product having a JIS A hardness of 40 to 56.

9. A polyol-crosslinkable fluororubber composition according to claim 1, for use as a vulcanization molding material for rubber parts of a hard disk drive.

10. A polyol-crosslinkable fluororubber composition according to claim 5, for use as a vulcanization molding material for rubber parts of a hard disk drive.

* * * * *